C. C. TERRY.
STARTING AND SCAVENGING VALVE FOR INTERNAL COMBUSTION ENGINES.
APPLICATION FILED OCT. 11, 1915.
1,284,490. Patented Nov. 12, 1918.
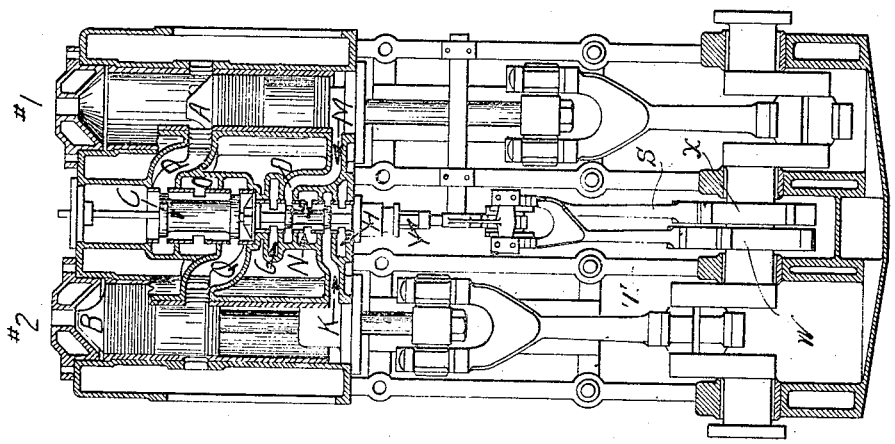
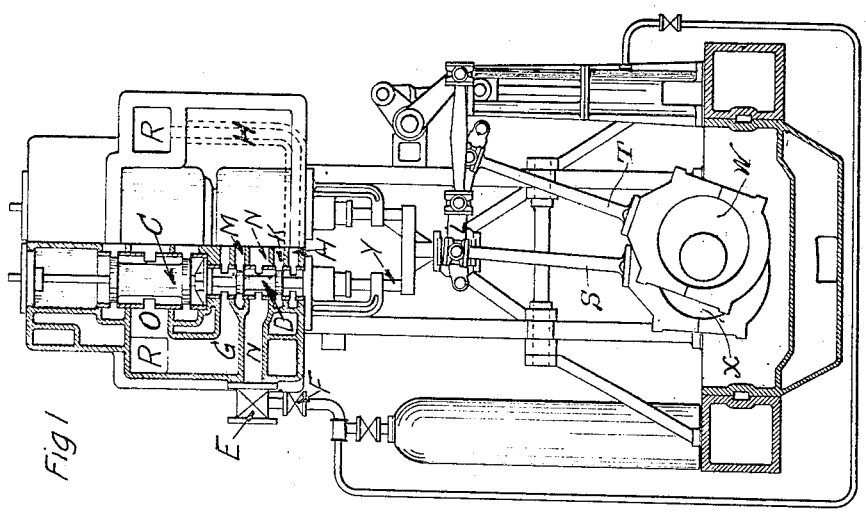
WITNESSES: INVENTOR

UNITED STATES PATENT OFFICE.

CLYDE C. TERRY, OF SEATTLE, WASHINGTON.

STARTING AND SCAVENGING VALVE FOR INTERNAL-COMBUSTION ENGINES.

1,284,490.   Specification of Letters Patent.   Patented Nov. 12, 1918.

Application filed October 11, 1915. Serial No. 55,216.

*To all whom it may concern:*

Be it known that I, CLYDE C. TERRY, a citizen of the United States, residing at Seattle, in the county of King and State of Washington, have invented a new and useful Improvement in Starting and Scavenging Valves for Internal - Combustion Engines, of which the following is a specification.

My invention relates to improvements in that type of internal combustion engines the power cylinders of which operate on the two-stroke cycle, and the objects of my invention are: first, to provide in internal combustion engines an arrangement of starting and scavenging valves, in combination with a construction of cylinders and pistons which shall enable the working parts of said internal combustion engines to be inspected, adjusted, and repaired with the minimum expenditure of time and expense; second, to place the starting and scavenging valves of internal combustion engines in such a manner as to enable the cylinder heads of the working cylinders of said internal combustion engines to be cooled without difficulty; third, to provide, in internal combustion engines, starting and scavenging valves of the sliding type and to so place these valves as to permit the use of positive motion, direct action, valve gear to actuate said valves; fourth, to provide, in internal combustion engines, a starting valve of the sliding type and of reciprocating motion only, which said valve shall at the proper time, accurately and directly distribute to two cylinders, without the imposition of any other valve between said starting valve and either of said cylinders, all necessary starting air, said starting valve being at no time exposed to the temperature and pressure of the explosion or combustion of the working medium of said internal combustion engines; fifth, to provide, in internal combustion engines, a scavenging valve of the sliding type and of reciprocating motion only, which shall accurately and directly distribute to two cylinders, the air used to scavenge said two cylinders, said scavenging valve being so timed as to begin to admit air alternately to each of said cylinders at a time when the exhaust gases in the cylinder to which air is being admitted have reached their point of lowest pressure, said scavenging valve being at no time exposed to the pressure and temperature of the explosion or combustion of the working medium of said internal combustion engines; sixth, to provide, in internal combustion engines, a means whereby the starting valve may be caused (after said internal combustion engine shall have been started) to alternately admit air at atmospheric pressure to each of two cylinders and to alternately discharge air from each of the said cylinders to a scavenging air receiver; seventh, to provide, in internal combustion engines, an arrangement of starting valves and scavenging valves in sets, each set consisting of one starting valve with one scavenging valve superimposed upon the same valve stem, in such a manner that all the starting and scavenging valves serving two cylinders may be actuated by a single valve gear of positive motion and direct action; eighth, to provide, in internal combustion engines, a starting valve of the sliding type and of reciprocating motion only, said valve serving directly two cylinders, and said valve being at no time during the cycle of said internal combustion engines, exposed to the temperature and pressure of explosion or combustion of the working medium of said internal combustion engines, in combination with a reversible valve gear of positive motion, whereby the direction of rotation of said internal combustion engine may be reversed.

I attain these objects by the mechanism illustrated in the accompanying drawing, in which Figure 1 is a vertical section through the engine, showing the reversible, positive motion, valve gear, the scavenging air receiver, the two controlling valves, and a set of starting and scavenging valves with ports and connecting passages to the scavenging air receiver and to the two controlling valves, and Fig. 2 is a vertical section through the engine, showing a pair of cylinders with pistons, piston rods, guided crossheads, connecting rods, the crank shaft, framing bed plate, eccentrics, reversible, positive motion, valve gear, and a set of starting and scavenging valves with ports and connecting passages. Similar letters and similar figures refer to similar parts and similar passages throughout the two views.

The mechanism consists of an internal combustion engine operating on the two stroke cycle with two or more cylinders arranged in pairs, each pair of cylinders being connected through suitable columns and framing to a bed plate within which shall revolve a crankshaft with two cranks set at about 180° to each other, each of said cylinders comprising said pair of cylinders being fitted with a piston slightly greater in length than the stroke thereof, which piston is connected to said crankshaft through a piston rod, a guided crosshead, and a connecting rod; that part of each cylinder comprising said pair of cylinders below said piston and nearest the said crankshaft being connected by suitable passages and ports, to a valve or valves of the sliding type and of reciprocating motion only, said valve or valves being so placed as not to be exposed to the temperature and pressure of explosion or combustion of the working medium of said internal combustion engine, said valve or valves being so actuated as to alternately connect said lower end of said cylinders with a central passage which central passage opens through suitable controlling valves, either to the storage reservoir for compressed starting air, as when starting said internal combustion engine, or to the atmosphere, as when said internal combustion engine is operating under its own power, as the case may be; and the upper end of each cylinder above the said piston and most distant from the said crankshaft being connected through a port in the wall of said cylinder and a suitable passage to a port controlled by a scavenging valve or valves of the sliding type, said valve or valves being placed approximately between the said pair of cylinders and not at any time exposed to the temperature and pressure of explosion or combustion of the working medium of said internal combustion engine, said valve or valves being so actuated as to alternately connect said upper end of each said cylinder with a central passage opening to a scavenging air receiver, at a time when the piston of said cylinder being so connected shall have reached a position approximately most distant from the position at which the explosion or combustion of the working medium of said internal combustion engine took place and when the exhaust gases in said cylinder shall have reached their point of lowest pressure; both said starting valve or valves and said scavenging valve or valves being driven from the said crankshaft through a single positive motion, valve gear causing said internal combustion engine to operate as follows: Piston A being near the bottom dead center, valve stem Y with valves C and D is raised, by means of eccentric X, through eccentric rod S, thus making the following connections: Cylinder #1, above piston A, is connected to the scavenging air receiver R, through passages O and P, thus scavenging this cylinder; cylinder #1, below piston A, is connected to compressed air through passages N and M and valve F, thus starting said internal combustion engine; cylinder #2, below piston B, is connected to the scavenging air receiver R, through passages K and H, thus creating pressure in scavenging air receiver R, as piston B descends.

Said internal combustion engine now having made one half a revolution, piston B being near the bottom dead center, valve stem Y, with valves C and D, is lowered, by means of eccentric X, through eccentric rod S, thus making the following connections: Cylinder #2 above piston B, is connected to the scavenging air receiver R, through passages O and Q, thus scavenging this cylinder; cylinder #2, below piston B, is connected to compressed air, through passages N and K, thus continuing the starting of said internal combustion engine; cylinder #1, below piston A, is connected to scavenging air receiver R, through passages M and G, thus creating pressure in scavenging air receiver R, as piston A descends.

Said internal combustion engine having obtained an expansion, due to internal combustion in one or more of the cylinders above the exhaust ports, compressed air is shut off from passage N, by closing valve F, and passage N is opened to the atmosphere, by opening valve E; thus causing cylinder #1, below piston A, and cylinder #2, below piston B, to operate as scavenging pumps to supply all or a part of the air to scavenging air receiver R.

Said internal combustion engine may be caused to rotate in the reverse direction as follows: Piston B being on the down stroke, link L is so shifted that valve stem Y, with valves C and D, is operated by eccentric W, through eccentric rod T, thus lowering valve stem Y, with valves C and D, and making the following connections: Passage N having been shut off from the atmosphere, by closing valve E, and connected to compressed air, by opening valve F, cylinder #2, below piston B, is connected to compressed air through passages N and K, thus arresting piston B on its down stroke, and causing said piston B to rise, thus causing said internal combustion engine to start rotating in the reverse direction, and valve stem Y, with valves C and D, now being actuated by eccentric W, through eccentric rod T, the cycle of operations obtained, while starting and operating in said reverse direction of rotation, is the same as the cycle of operations obtained, while starting and operating in the direction of rotation, first described in this specification.

I claim:

1. In internal combustion engines comprising a pair of cylinders and a piston for each cylinder, the combination of a reversible valve gear; a sliding valve, five ports controlled by said sliding valve, said ports connecting through suitable passages as follows, one of said ports to a central passage, which central passage may be connected at will to either a storage reservoir for compressed air or to the atmosphere, two of said ports, one each to the lower side of one of the two pistons, the remaining two of said ports to a scavenging air receiver, a scavenging valve of the sliding type superimposed upon the same valve stem with the aforesaid sliding valve and three ports controlled by the said scavenging valve of the sliding type, said three ports connecting through suitable passages as follows, one to the scavenging air receiver heretofore mentioned and the remaining two, one each to an opening in the wall of one of two cylinders which cylinders contain the pistons heretofore mentioned, all substantially as and for the purpose set forth.

2. In internal combustion engines, a starting valve of the sliding type and of reciprocating motion only, said valve controlling five ports, two of which five ports communicate through suitable passages to a scavenging air receiver, another two of which five ports communicate through suitable passages, one to each of two cylinders and the remaining one of which five ports communicates to a central passage which central passage is fitted with two controlling valves, the one of said controlling valves opening to a storage reservoir for compressed air, and the other of said controlling valves opening to the atmosphere, said starting valve being at no time exposed to the temperature or pressure of explosion or combustion of the working medium of said internal combustion engine and said starting valve being so actuated by a positive motion valve gear, acting directly upon the valve stem of said starting valve from the crank shaft of said internal combustion engine in which it is incorporated, that said starting valve, when the said controlling valve opening to the storage reservoir for compressed air shall be opened and the other of the said two controlling valves be closed, admits starting air alternately to each of the two said cylinders and exhausts this air to the aforesaid scavenging air receiver and, when the said controlling valve opening to the atmosphere shall be opened and the other of the said two controlling valves shall be closed, admits air at atmospheric pressure, alternately to each of said two cylinders, and discharges this air alternately from each of said two cylinders to the aforesaid scavenging air receiver.

3. In internal combustion engines, the combination of a pair of cylinders of equal bore throughout their length with both ends of said cylinders fitted with substantial covers, a scavenging air receiver, a reservoir for compressed air, two controlling valves, one of which opens to said reservoir for compressed air and the other of which opens to the atmosphere; a starting valve of the sliding type, controlling five ports each of which ports opens to a suitable passage, which passages to the said five ports connect as follows, two of the passages to the aforesaid scavenging air receiver, another two of the passages, one each, to that end of each of the said two cylinders which is nearest the crankshaft, the remaining passage to the aforesaid two controlling valves; a scavenging valve of the sliding type superimposed upon the same valve stem with and actuated by the same valve gear as the aforesaid starting valve, said scavenging valve controlling three ports each of which ports opens to a suitable passage which passages from the said three ports connect as follows, two of the passages, one each, to scavenging ports located in the walls of each of the aforesaid two cylinders at a point near their mid-length, the remaining passage to the aforesaid scavenging air receiver; all substantially as and for the purpose set forth.

C. C. TERRY.

Witnesses:
GENE E. ETZLER,
THEO. H. WIGGINS.

Copies of this patent may be obtained for five cents each, by addressing the "Commissioner of Patents, Washington, D. C."